(12) United States Patent
Saeki

(10) Patent No.: US 6,842,263 B1
(45) Date of Patent: Jan. 11, 2005

(54) PRINT SYSTEM AND PRINTER DEVICE FACILITATING REUSE OF PRINT DATA

(75) Inventor: Iwao Saeki, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/412,762

(22) Filed: Oct. 5, 1999

(30) Foreign Application Priority Data

| Oct. 9, 1998 | (JP) | ............................................. 10-287847 |
| Mar. 23, 1999 | (JP) | ............................................. 11-077054 |
| Aug. 6, 1999 | (JP) | ............................................. 11-223329 |

(51) Int. Cl.[7] .............................................. G06F 15/00
(52) U.S. Cl. ....................... 358/1.15; 358/1.15; 358/444
(58) Field of Search .............................. 358/1.15–1.18, 358/1.6, 1.13, 442, 404; 709/1; 395/186

(56) References Cited

U.S. PATENT DOCUMENTS

| 5,333,246 A | | 7/1994 | Nagasaka |
| 5,970,228 A | * | 10/1999 | Nezu ............................ 713/200 |
| 6,025,925 A | * | 2/2000 | Davidson et al. ............ 358/1.15 |
| 6,075,615 A | * | 6/2000 | Nakamura ................... 358/1.14 |
| 6,307,639 B1 | * | 10/2001 | Eom et al. ................... 358/1.13 |
| 6,333,790 B1 | * | 12/2001 | Kageyama ................... 358/1.15 |
| 6,400,466 B1 | * | 6/2002 | Yamazaki et al. ............. 358/1.6 |
| 6,401,109 B1 | * | 6/2002 | Heiney et al. ................... 709/1 |
| 6,452,693 B1 | * | 9/2002 | Isoda et al. .................. 358/1.16 |

FOREIGN PATENT DOCUMENTS

| EP | 0 784 288 | 7/1997 |
| JP | 6-55783 | 3/1994 |
| JP | 9-114616 | 5/1997 |
| JP | 9-269879 | 10/1997 |

OTHER PUBLICATIONS

U.S. patent application Ser. No. 09/407,768, filed Sep. 29, 1999, pending.
U.S. patent application Ser. No. 09/412,762, filed Oct. 05, 1999, pending.

* cited by examiner

*Primary Examiner*—Kimberly A. Williams
*Assistant Examiner*—Saeid Ebrahimi
(74) *Attorney, Agent, or Firm*—Oblon, Spivak, McClelland, Maier & Neustadt, P.C.

(57) ABSTRACT

A print system includes a communication path, a client device which transmits print data to said communication path, a host device connected to said communication path, and a printer device which prints the print data after receiving the print data from said client device via said communication path, and automatically sends the print data together with printer output information to said host device via said communication path, said printer output information including keywords for identifying said print data.

25 Claims, 16 Drawing Sheets

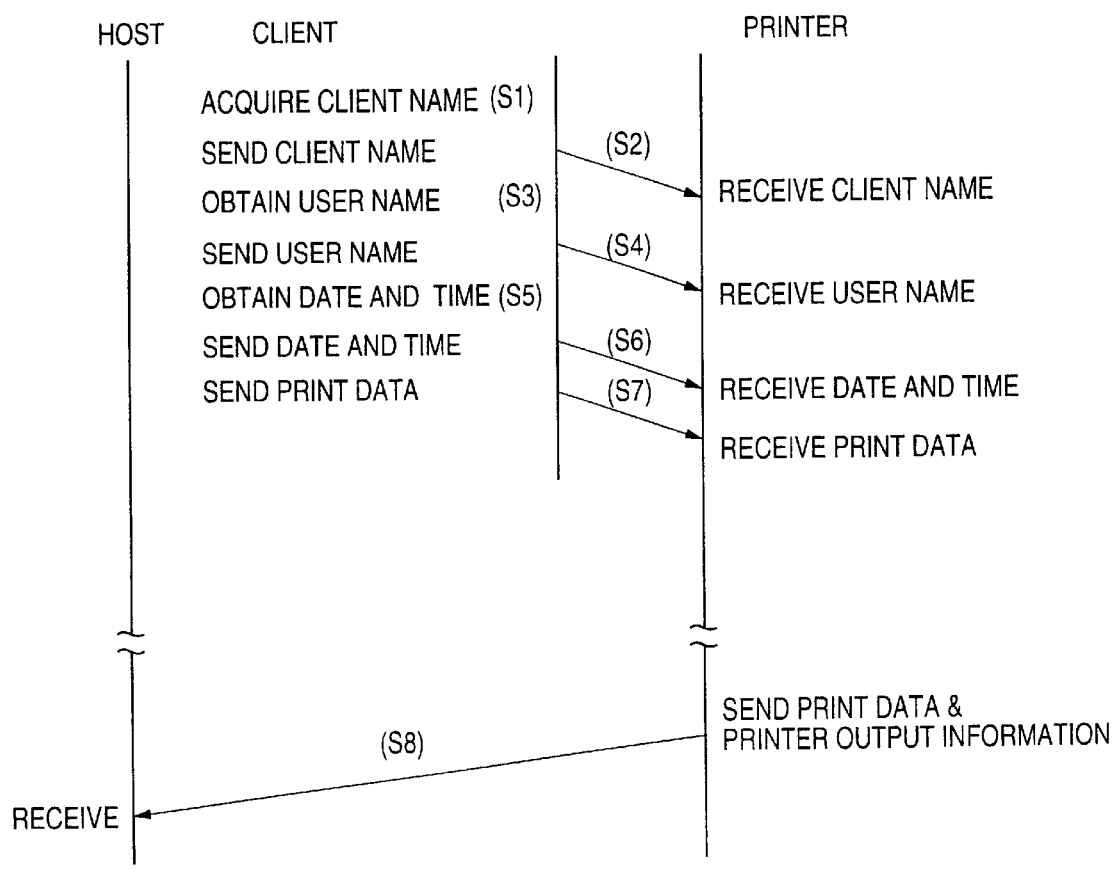

FIG. 8
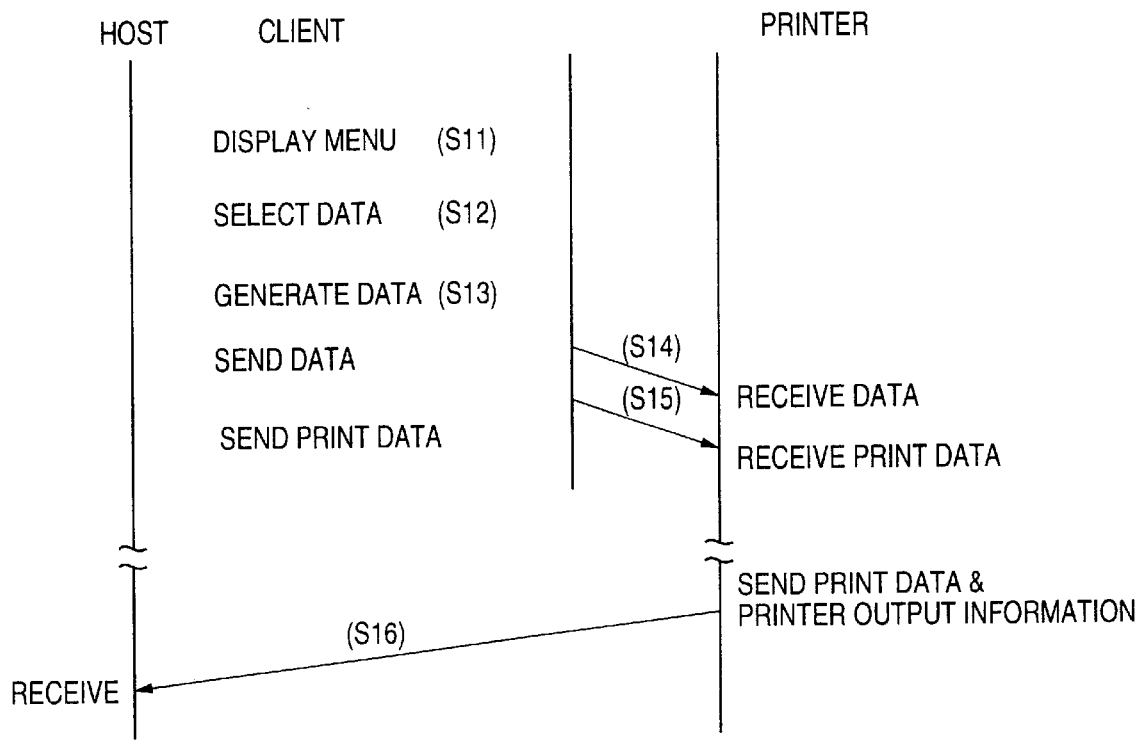
FIG. 9
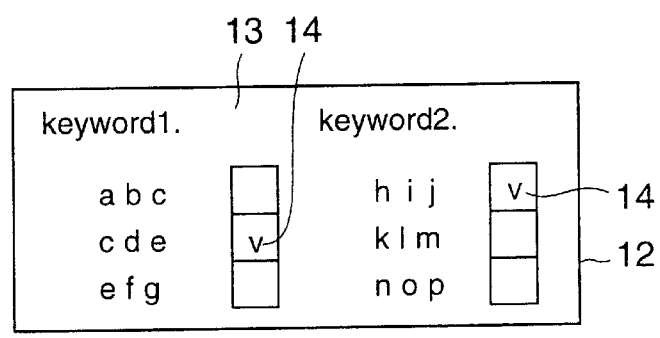
FIG. 10
<BEGIN DATA>
  keyword1 : cde
  keyword2 : hij
<END DATA> keyword1 : abc : cde : efg
keyword2 : hij : klm : nop

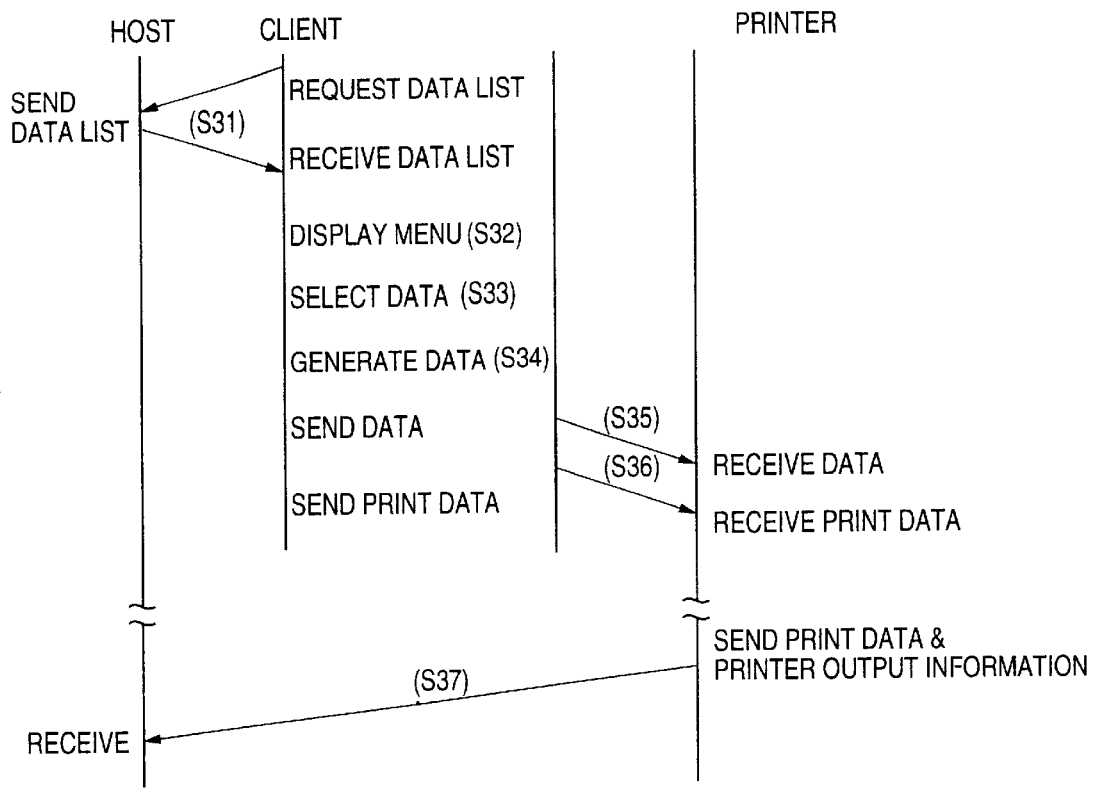
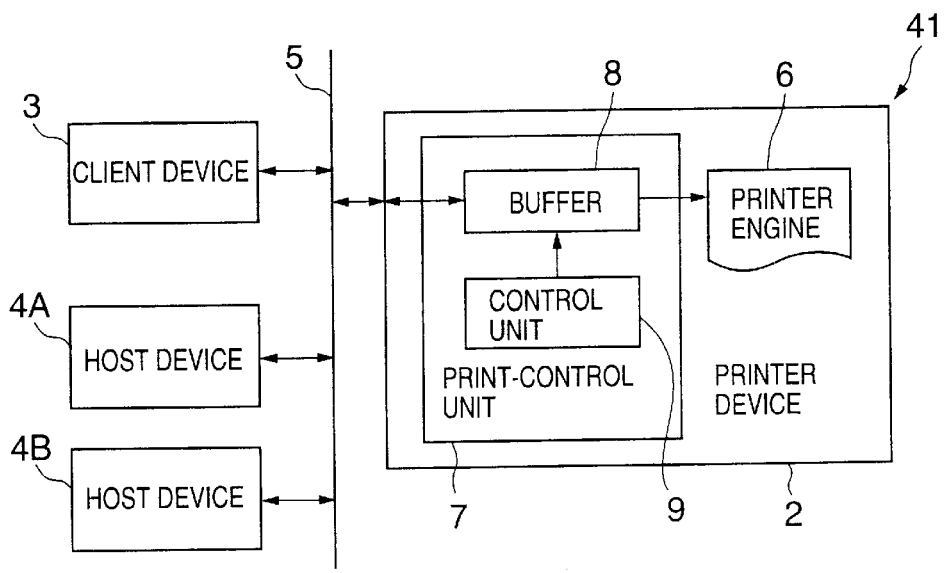

PRINT SYSTEM AND PRINTER DEVICE FACILITATING REUSE OF PRINT DATA

BACKGROUND OF THE INVENTION

1. Field of the Invention

The present invention relates to a print system which includes a printer device and a host device connected to each other via two-way communication path, and relates to the printer device which is used in such a system.

2. Description of the Related Art

In the technological art of printing, schemes for reprinting print data are available for the purpose of making reuse of print data. There is a need for such schemes when original printing fails because of unsatisfactory printing quality, jamming, malfunction, etc., or when reprinting is desired in order to correct unsatisfactory printing quality or in order to print more copies. To this end, various schemes have been presented, such as disclosed in Japanese Patent Laid-open Application No. 6-55783, Japanese Patent Laid-open Application No. 9-114616, and Japanese Patent Laid-open Application No. 9-269879.

These reprinting schemes make reuse of print data by storing printed print data in a printer or in a print server.

In such a configuration, all that is provided for the purpose of making reuse of original print data or reuse of print data with minor corrections is a crude data storage function to store printed print data in a printer or in a print server. With such a crude data storage function, it is difficult to make reuse of print data for purposes other than simple reprinting. When printed print data need to be collected to build a database, for example, the database need to be built in the printer or in the print server, which poses various restrictions. Further, such a database would be devoid of keywords necessary for appropriate data search. The only measure to create these keywords at the time of database construction would be to extract keywords from the print data. But the keywords extracted in such a manner would be too primitive to help to conduct an appropriate data search.

Accordingly, there is a need for a print system and a printer device which can help to make easy reuse of printed print data and can make it easier to build a database.

SUMMARY OF THE INVENTION

Accordingly, it is a general object of the present invention to provide a print system and a printer device which can satisfy the need described above.

It is another and more specific object to provide a print system and a printer device which can help to make easy reuse of printed print data and can make it easier to build a database.

In order to achieve the above object according to the present invention, a print system includes a communication path, a client device which transmits print data to said communication path, a host device connected to said communication path, and a printer device which prints the print data after receiving the print data from said client device via said communication path, and automatically sends the print data together with printer output information to said host device via said communication path, said printer output information including keywords for identifying said print data.

In the system described above, the printed print data is sent to the host device, so that the host device can make reuse of the print data for purposes such as use in a database.

Further, since the printer output information inclusive of the keywords for identifying the print data is send together with the print data, a data search can be readily conducted without a need for creating keywords at the host device.

According to another aspect of the present invention, a printer device connected to a client device and a host device via a communication path includes a memory unit which stores print data therein sent from the client device via the communication path, a printer engine which prints the print data stored in said memory unit, and a processing unit which automatically sends printer output information together with the print data stored in said memory unit to the host device via the communication path when said printer engine prints the print data, said printer output information including keywords for identifying said print data.

When such a printer device as described above is used in a print system, the host device can make easy reuse of the print data for purposes such as use in a database.

According to another aspect of the present invention, a printer device connected to a client device and a host device via a communication path includes a data buffer which stores print data therein received from the client device via the communication path, an image rendering unit which generates image data by expanding the print data stored in said data buffer, a frame buffer which stores therein the image data, a printer engine which prints the image data supplied from said frame buffer, and a control unit which automatically sends the image data to the host device via the communication path when said printer engine prints the image data.

Since the printer device described above sends the image data to the host device, the host device can make easy reuse of the printed image data for various purposes. When another reproduction needs to be printed, for example, use of the image data makes it possible to obtain a reproduction almost identical to the original reproduction.

A printer device connected to a client device and a host device via a communication path includes a data buffer which stores print data therein received from the client device via the communication path, an image rendering unit which generates image data by expanding the print data stored in said data buffer, a frame buffer which stores therein the image data, a printer engine which prints the image data supplied from said frame buffer, a text buffer which stores therein text data corresponding to the print data, and a control unit which automatically sends at least one of the image data, the print data, and the text data to the host device via the communication path when said printer engine prints the image data.

Use of the printer device as describe above allows the host device to make easy reuse of the data for various purposes. When another reproduction needs to be printed, for example, use of the image data makes it possible to obtain a reproduction almost identical to the original reproduction. Further, when text data is needed, the text data supplied from the printer device as it is can be used. Since the text data is readily available, there is no need for the host device to have a program for interpreting the print data.

Other objects and further features of the present invention will be apparent from the following detailed description when read in conjunction with the accompanying drawings.

BRIEF DESCRIPTION OF THE DRAWINGS

FIG. 6 is an illustrative drawing showing a configuration of an appendix-data list;

FIG. 7 is a sequence chart showing an operation of a print system according to a fourth embodiment of the present invention;

FIG. 8 is a sequence chart showing an operation of a print system according to a fifth embodiment of the present invention;

FIG. 9 is an illustrative drawing showing an example of a menu shown on a display;

FIG. 10 is an illustrative drawing showing an example of appendix information generated from items selected from the menu of FIG. 9;

FIG. 13 is a sequence chart showing an operation of a print system according to a seventh embodiment of the present invention;

FIG. 14 is a block diagram of a print system according to an eighth embodiment of the present invention;

DESCRIPTION OF THE PREFERRED EMBODIMENTS

In the following, embodiments of the present invention will be described with reference to the accompanying drawings.

Figure 1:
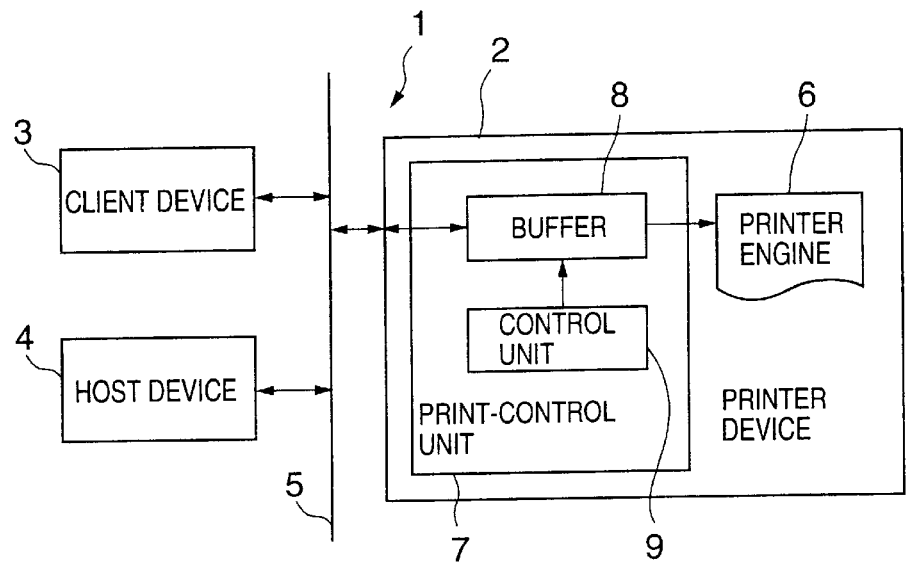
FIG. 1 is a block diagram of a print system according to a first embodiment of the present invention.

FIG. 1 is a block diagram of a print system according to a first embodiment of the present invention.

A print system 1 of FIG. 1 includes a printer device 2, a client device 3, a host device 4, and a communication path 5 connecting these devices together. The communication path 5 is comprised of a LAN or the like providing two-way communications. The client device 3 may be a personal computer, a word-processor device, or the like. The client device 3 has various computing functions for attending to data processing, and sends print data to the printer device 2 via the communication path 5. One or more client devices 3 may be provided as many as necessary, and are connected to the communication path 5. The host device 4 may be a personal computer, a workstation, or the like, and serves as a platform where a database is built. The host device 4 has various computing functions to attend to data processing, and is provided with a large memory capacity.

The printer device 2 includes a printer engine 6 and a print-control unit 7. The printer engine 6 utilizes an electronic printing process or the like to print based on print data. The print-control unit 7 exchanges data with the client device 3, the host device 4, and the printer engine 6, and attends to various control operations. The print-control unit 7 includes a buffer 8 for temporal storage of a print data and a control unit 9 having computing functions for attending to various control processes. The control unit 9 implements a data transfer function, an information attaching function, a transmission/no-transmission selecting function, etc., as will be described later.

Figure 2:
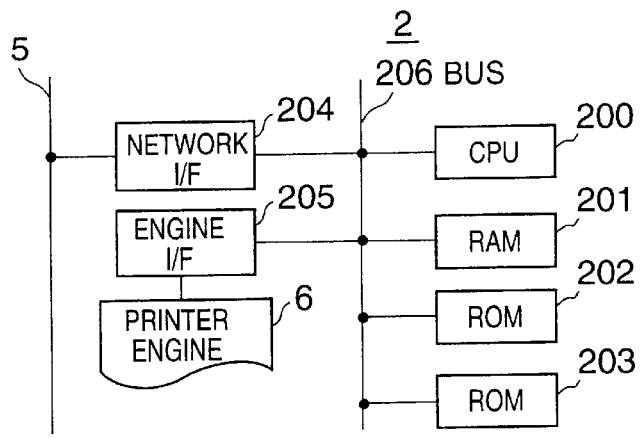
FIG. 2 is a block diagram showing a hardware configuration of a printer device according to the present invention.

FIG. 2 is a block diagram showing a hardware configuration of the printer device 2 according to the present invention.

The printer device 2 of FIG. 2 includes a CPU 200, a RAM 201, a first ROM 202, a second ROM 203, a network interface 204, an engine interface 205, a bus 206, and the printer engine 6. The first ROM 202 stores program codes, and the second ROM 203 stores font data. The CPU 200 executes program codes after these program codes are loaded from the first ROM 202 to the RAM 201. The RAM 201 serves as a work space for execution of the program codes, and, also, serves as a buffer and a frame memory. Print data is received by the network interface 204 to be stored in the buffer of the RAM 201. The print data stored in the buffer of the RAM 201 is expanded in the frame memory of the RAM 201 by using the font data of the second ROM 203 if necessary. The expanded data (image data) is sent from the RAM 201 to the printer engine 6 via the engine interface 205, and is printed by the printer engine 6.

When a comparison is made between FIG. 1 and FIG. 2, the control unit 9 of FIG. 1 corresponds to control functions performed by the CPU 200 using program codes stored in the first ROM 202. The buffer 8 corresponds to the buffer function of the RAM 201. In the first and following embodiments which will be described hereinafter, control functions and other associated processing are basically implemented by relevant elements of the configuration shown in FIG. 2.

With reference to FIG. 1 again, when the client device 3 transmits print data, the print data received by the printer device 2 is stored in the buffer 8. The control unit 9 supplies the print data (i.e., expanded data to be exact) from the buffer 8 to the printer engine 6 for the printing purpose. After the printing of the print data, the control unit 9 sends the printed print data to the host device 4 via the communication path 5. This corresponds to the data transfer function of the present invention.

When sending the printed print data to the host device 4, the control unit 9 attaches printer output information to the printed print data.

Figure 3:
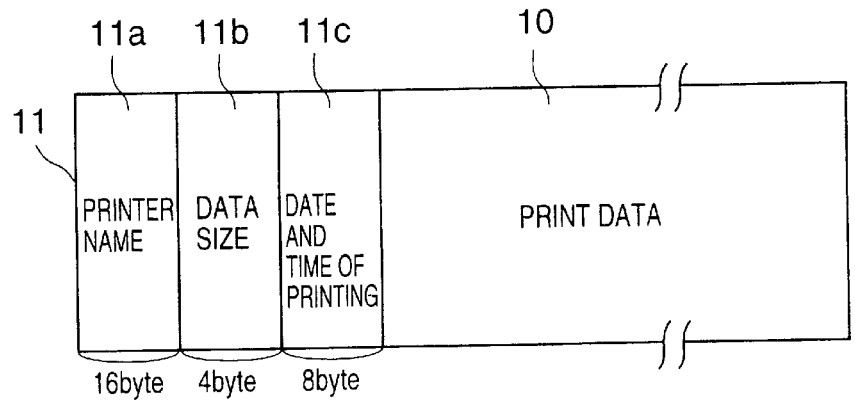
FIG. 3 is an illustrative drawing showing an example of print data having printer output information attached thereto.

FIG. 3 is an illustrative drawing showing an example of print data having printer output information attached thereto.

As shown in FIG. 3, printer output information 11 attached to print data 10 includes a printer name 11a, a data size 11b, a date and time of printing 11c, etc. In this manner, the control unit 9 performs the information attaching function of the present invention. The printer name 11a is a name of the printer device 2, and may be 16-byte data, for example. The data size 11b is a size of the print data 10, and may be 4-byte data, for example. The date and time of printing 11c indicates a data and time at which the print data is printed, and may be 8-byte data, for example.

A timing at which the print data 10 is transmitted to the host device 4 may be after the printing operation, or may be before the printing operation. Further, in this embodiment, the print data 10 may be any type of data, and can be image data, PDL (print description language) data such as Postscript, or the like.

Accordingly, the host device 4 receives the printed print data having the printer output information 11 attached thereto. Since the printer output information 11 is usable as keyword information for a search when the print data is to be reused, building of a database of print data becomes easier, and reuse of the print data is easily made.

Figure 4:
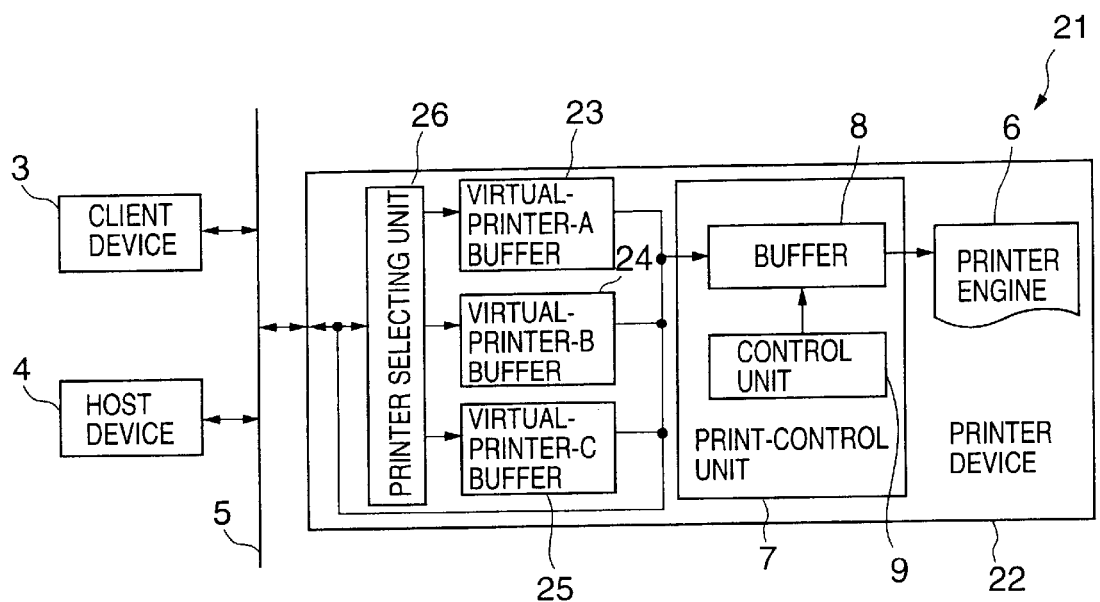
FIG. 4 is a block diagram of a print system according to a second embodiment of the present invention.

FIG. 4 is a block diagram of a print system according to a second embodiment of the present invention. In FIG. 4, the same elements as those of FIG. 1 are referred to by the same numerals, and a description thereof will be omitted.

A printer device 22 of a print system 21 shown in FIG. 4 serves as a selected one of a virtual printer A, a virtual printer B, a virtual printer C. The printer device 22 includes a virtual-printer-A buffer 23, a virtual-printer-B buffer 24, and a virtual-printer-C buffer 25, which correspond to the virtual printers A, B, and C, respectively. The printer device 22 further includes a printer selecting unit 26 for selecting one of the virtual-printer-A buffer 23, the virtual-printer-B buffer 24, and the virtual-printer-C buffer 25.

Here, virtual printers are used for their respective printing purposes. For example, a bill-printing-purpose virtual printer, a receipt-printing-purpose virtual printer, and an cost-estimate-printing-purpose virtual printer may be provided. When a bill is to be printed out, the bill-printing-purpose virtual printer is selected and used. Another example is to provide virtual printers for respective users. Namely, a user-A virtual printer, a user-B virtual printer, and a user-C virtual printer may be provided, and a particular one of these virtual printers is used when a particular user uses the printer device 22.

In the configuration of FIG. 4, when the client device 3 sends printer data together with an indication of one of the virtual printers A, B, and C, the printer selecting unit 26 selects a corresponding one of the virtual-printer buffers 23 through 25 so that the received print data is stored in the selected buffer. Where the virtual printer A is indicated, for example, the received data is stored in the virtual-printer-A buffer 23. The print data of the virtual-printer-A buffer 23 is then stored in the buffer 8 along with information indicative of the virtual printer A. The control unit 9 supplies the print data from the buffer 8 to the printer engine 6 for the printing purpose. In so doing, only the print data without attached information is sent to the printer engine 6. After the printing, the control unit 9 transmits the printed print data together with printer output information from the buffer 8 to the host device 4 via the communication path 5. Here, the printer output information is attached at the beginning of the print data in the same manner as shown in FIG. 3, and includes an indication of one of the virtual printers A, B, and C.

In this manner, the operation of the second embodiment is basically the same as that of the first embodiment, except that an indication of one of the virtual printers A, B, and C used for the actual printing process is included in the printer output information. Inclusion of such a indication in the printer output information makes it possible to use an identity of a virtual printer as a key for search.

Figure 5:
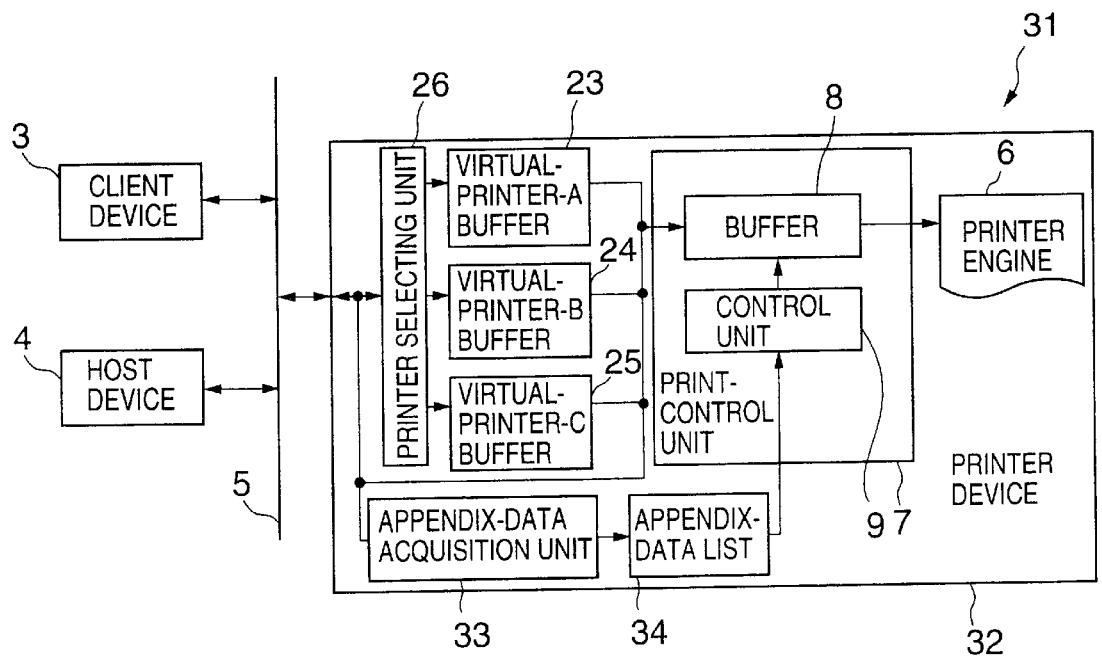
FIG. 5 is a block diagram of a print system according to a third embodiment of the present invention.

FIG. 5 is a block diagram of a print system according to a third embodiment of the present invention. In FIG. 5, the same elements as those of FIG. 3 are referred to by the same numerals, and a description thereof will be omitted.

A printer device 32 of a print system 31 shown in FIG. 5 includes an appendix-data acquisition unit 33 and an appendix-data list 34 in addition to the configuration of FIG. 4. The appendix-data list 34 is a list received from the host device 4 where the list is prepared in the host device 4 to specify possible items of the printer output information.

FIG. 6 is an illustrative drawing showing a configuration of the appendix-data list 34.

As shown in FIG. 6, the appendix-data list 34 includes names of the virtual printers A, B, and C, and further includes keywords associated with each of the names and separated by colons. The appendix-data acquisition unit 33 selects one of the list (i.e., select a printer name and associated keywords) from the appendix-data list 34.

A typical example of a set of keywords associated with a given virtual printer includes a date and time of data acquisition, a type of use of the printer, and a user name. If appropriate, a number of printed copies, paper size, and the like may be incorporated.

In the configuration of FIG. 6, when the client device 3 sends printer data together with an indication of one of the virtual printers A, B, and C, the printer selecting unit 26 selects a corresponding one of the virtual-printer buffers 23 through 25 so that the received print data is stored in the selected buffer. Where the virtual printer A is indicated, for example, the received data is stored in the virtual-printer-A buffer 23. The print data of the virtual-printer-A buffer 23 is then stored in the buffer 8 along with information that is selected from the appendix-data list 34 by the appendix-data acquisition unit 33 such as to correspond to the indicated virtual printer A. The control unit 9 supplies the print data from the buffer 8 to the printer engine 6 for the printing purpose. In so doing, only the print data without attached information is sent to the printer engine 6. After the printing, the control unit 9 transmits the printed print data together with printer output information from the buffer 8 to the host device 4 via the communication path 5. Here, the printer output information is attached at the beginning of the print data in the same manner as shown in FIG. 3, and includes the information selected from the appendix-data list 34.

In this manner, the operation of the third embodiment is basically the same as that of the second embodiment, except that the host device 4 prepares the appendix-data list and that the printer device 32 selects information to be included in the printer output information from the appendix-data list 34. This configuration insures data consistency between the host device 4 and the printer device 32, and, also, makes it possible to dynamically change the contents of the printer output information.

FIG. 7 is a sequence chart showing an operation of a print system according to a fourth embodiment of the present invention. The print system of the fourth embodiment has the same configuration as that of the first embodiment shown in FIG. 1.

According to the fourth embodiment, the printer device 2 receives from the client device 3 client information such as a client name, a user name, and the like separately from print data when the print data is to be printed. The printer device 2 attaches the client information as printer output information to the printed print data, and sends the print data with the attached information to the host device 4. Namely, the client device 3 transmits information to be attached and print data to the printer device 2. When the print data is supplied to the printer engine 6, of course, the attached information is not affixed to the print data.

With reference to FIG. 7, data exchanges between the client device 3, the printer device 2, and the host device 4 will be described below.

When print data is to be printed, the client device 3 acquires a client name (step S1). The client device 3 then sends the client name to the printer device 2 (step S2). Further, the client device 3 obtains a user name (step S3). Then, the client device 3 sends the obtained user name to the printer device 2 (step S4). Further, the client device 3 obtains a current date and time (step S5), and sends the current data and time to the printer device 2 (step S6). After transmitting all of the information identified above, the client device 3 sends print data to the printer device 2 (step S7). After the printing, the printer device 2 sends the print data together with the attached information (printer output information) to the host device 4 (step S8).

In this manner, the operation of the fourth embodiment is basically the same as that of the second embodiment, except that the client device 3 prepares client information as printer output information that is to be attached to the print data. This configuration makes it possible to provide keywords relating to the client device 3 when such keywords cannot be obtained in the printer device 2.

FIG. 8 is a sequence chart showing an operation of a print system according to a fifth embodiment of the present invention. The print system of the fifth embodiment has the same configuration as that of the first embodiment shown in FIG. 1.

In the fifth embodiment, information to be attached to print data at the time of transmission of the print data to the host device 4 is prepared at the FIG. 10, data of the appendix information is placed between <BEGIN DATA> and <END DATA> in order to distinguish itself from print data.

In this manner, the operation of the fifth embodiment is basically the same as that of the fourth embodiment, except that user selection of items is made at the client device 3. This configuration makes it possible to provide various keys in addition to the client name and the user name.

Figures 11, 12:
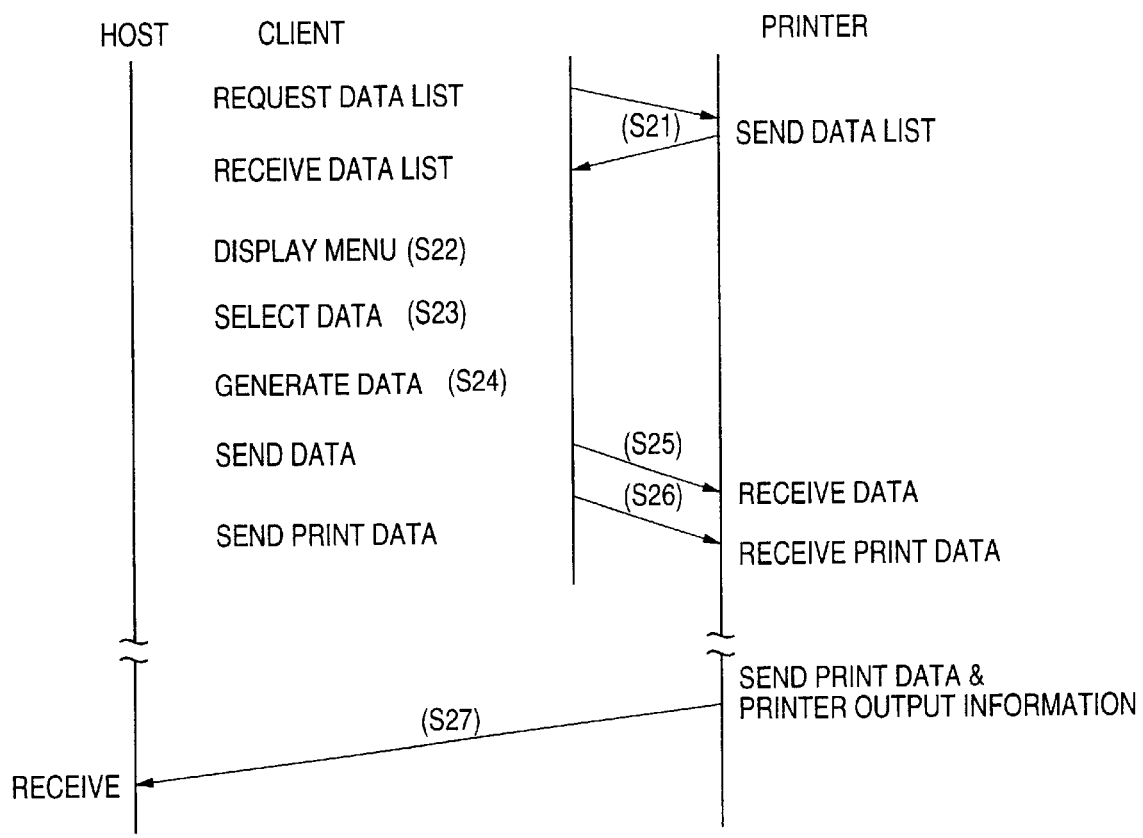
FIG. 11 is a sequence chart showing an operation of a print system according to a sixth embodiment of the present invention.
FIG. 12 is an illustrative drawing showing an example of a data list.

FIG. 11 is a sequence chart showing an operation of a print system according to a sixth embodiment of the present invention. The print system of the sixth embodiment has the same configuration as that of the first embodiment shown in FIG. 1.

In the sixth embodiment, the client device 3 receives a data list from the printer device 2. Items are then selected from the received data list, and are transmitted to the printer device 2 as appendix information that is to be attached to print data at the time of transmission of the print data to the host device 4.

With reference to FIG. 11, data exchanges between the client device 3, the printer device 2, and the host device 4 will be described below.

When print data is to be printed, the client client device 3.

With reference to FIG. 8, data exchanges between the client device 3, the printer device 2, and the host device 4 will be described below.

When print data is to be printed, the client device 3 displays a menu on a display thereof (step S11). A user of the client device 3 selects items from the menu (step S12), and the client device 3 generates appendix information from the selected items (step S13). Then, the client device 3 sends the appendix information to the printer device 2 (step S14). After transmitting the appendix information, the client device 3 sends print data to the printer device 2 (step S15). After the printing, the printer device 2 sends the print data together with the appendix information (i.e., printer output information) to the host device 4 (step S16).

FIG. 9 is an illustrative drawing showing an example of a menu shown on a display. As shown in FIG. 9, a menu 13 is shown on a display 12, and selected items of the menu 13 are indicated by check marks 14.

FIG. 10 is an illustrative drawing showing an example of appendix information generated from the items selected from the menu 13 of FIG. 9. As shown in device 3 initiates communication with the printer device 2 to request a data list, and receives the data list sent from the printer device 2 (step S21).

FIG. 12 is an illustrative drawing showing an example of the data list. As shown in FIG. 12, the data list is comprised of keyword names and key items associated with each of the keyword names. For example, the keyword names are "user name" and "type of use of printer". For the keyword "user name", actual names of users are arranged as key items. For the keyword "type of use of printer", names of virtual printers may be arranged as key items.

With reference to FIG. 11 again, the client device 3 displays a menu on a display thereof to present the contents of the received data list (step S22). A user of the client device 3 selects items from the menu (step S23), and the client device 3 generates appendix information from the selected items (step S24). Then, the client device 3 sends the appendix information to the printer device 2 (step S25). After transmitting the appendix information, the client device 3 sends print data to the printer device 2 (step S26). After the printing, the printer device 2 sends the print data together with the appendix information (i.e., printer output information) to the host device 4 (step S27).

In this manner, the operation of the sixth embodiment is basically the same as that of the fifth embodiment, except that user selection of items is made based on the data list sent from the printer device 2 to the client device 3.

In the sixth embodiment, the control unit 9 may be provided with a function to decide whether or not to transmit the printed print data to the host device 4, and may make such a decision based on the printer output information (i.e., appendix information) supplied from the client device 3. With this transmission/no-transmission selecting function, the printer device 2 can avoid sending unnecessary print data to the host device 4. Namely, this configuration can control the amount of print data transmitted to the host device 4.

FIG. 13 is a sequence chart showing an operation of a print system according to a seventh embodiment of the present invention. The print system of the seventh embodiment has the same configuration as that of the first embodiment shown in FIG. 1.

In the seventh embodiment, the client device 3 receives a data list from the host device 4. Items are then selected from the received data list, and are transmitted to the printer device 2 as appendix information that is to be attached to print data at the time of transmission of the print data to the host device 4.

With reference to FIG. 13, data exchanges between the client device 3, the printer device 2, and the host device 4 will be described below.

When print data is to be printed, the client device 3 initiates communication with the host device 4 to request a data list, and receives the data list sent from the host device 4 (step S31). In the same manner as shown in FIG. 12, the data list is comprised of keyword names and key items associated with each of the keyword names. The client device 3 displays a menu on a display thereof to present the contents of the received data list (step S32). A user of the client device 3 selects items from the menu (step S33), and the client device 3 generates appendix information from the selected items (step S34). Then, the client device 3 sends the appendix information to the printer device 2 (step S35). After transmitting the appendix information, the client device 3 sends print data to the printer device 2 (step S36). After the printing, the printer device 2 sends the print data together with the appendix information (i.e., printer output information) to the host device 4 (step S37).

FIG. 14 is a block diagram of a print system according to an eighth embodiment of the present invention.

A print system 41 of this embodiment includes a plurality of host devices 4A and 4B connected to the communication path 5. In this configuration, selection has to be made between the host device 4A and the host device 4B. According to the eighth embodiment, appendix information sent to the printer device 2 from the client device 3 is used for selecting one of the host device 4A and host device 4B as a recipient device of the print data.

In the configuration of FIG. 14, when the client device 3 transmits print data, the print data received by the printer device 2 is stored in the buffer 8. The control unit 9 supplies the print data from the buffer 8 to the printer engine 6 for the printing purpose. After the printing of the print data, the control unit 9 sends the printed print data to either one of the host device 4A and the host device 4B via the communication path 5. This corresponds to the data transfer function of the present invention. When sending the printed print data to the host device 4, the control unit 9 attaches printer output information to the printed print data. Here, the control unit 9 performs an information attaching function of the present invention. Selection of one of the host devices 4A and 4B is made by referring to a predetermined portion of the print data sent from the client device 3 to the printer device 2 where this portion of the print data contains a name of a recipient host device. Alternatively, selection is made by referring to a predetermined section of the information that is to be attached to the print data. In either case, the selection is made automatically by the control unit 9.

Accordingly, even when there are a plurality of host devices, the client device 3 can automatically select one of the host devices as a recipient of the print data.

Figure 15:
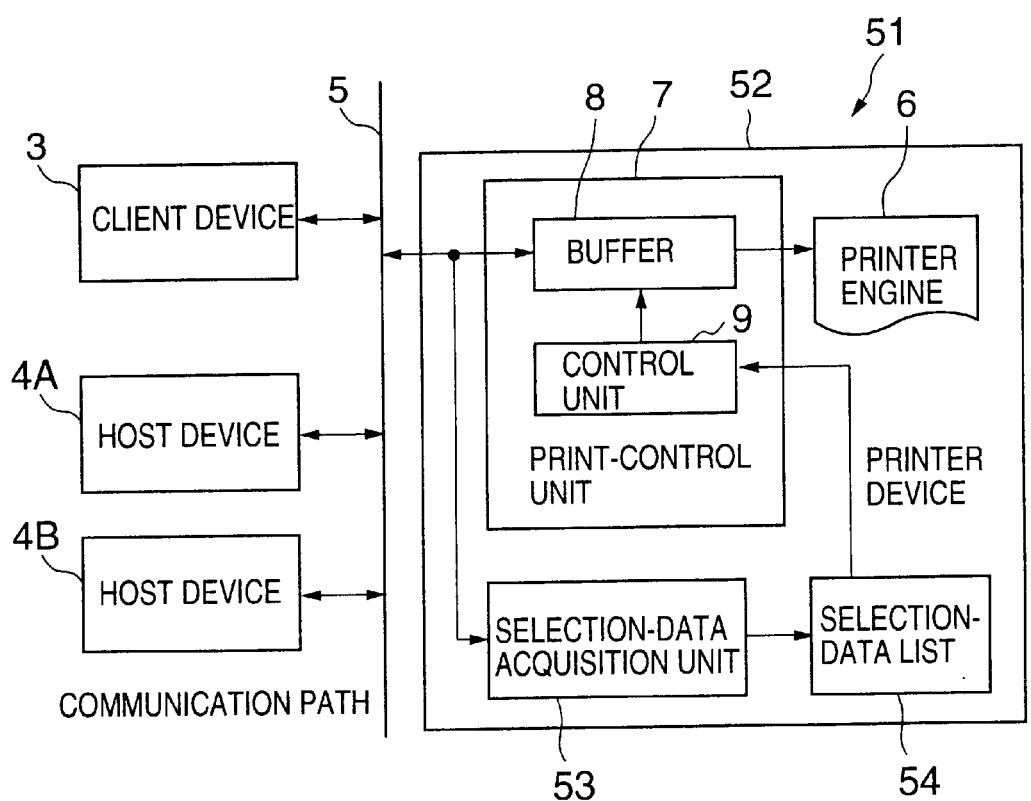
FIG. 15 is a block diagram of a print system according to a ninth embodiment of the present invention.

FIG. 15 is a block diagram of a print system according to a ninth embodiment of the present invention. In FIG. 15, the same elements as those of FIG. 14 are referred to by the same numerals, and a description thereof will be omitted.

A printer device 52 of a print system 51 according to the ninth embodiment include a selection-data acquisition unit 53 and a selection-data list 54 in addition to the configuration of the printer device 2 shown in FIG. 14. Each of the host devices 4A and 4B owns selection data. The printer device 52 receives appendix information from the client device 3 and the selection data from the host devices 4A and 4B, and compares the appendix information with the selection data to decide which one of the host devices 4A and 4B is selected. Namely, the selection-data list 54 is comprised of selection data received from the host devices 4A and 4B, and one of the host devices 4A and 4B is selected based on the appendix information and the selection-data list.

In the configuration of FIG. 15, when the client device 3 transmits print data, the printer device 2 receives the print data and stores it in the buffer 8. The control unit 9 supplies the print data from the buffer 8 to the printer engine 6 for the printing purpose. After the printing of the print data, the control unit 9 sends the printed print data to either one of the host device 4A and the host device 4B via the communication path 5. This corresponds to the data transfer function of the present invention. When sending the printed print data to the host device 4, the control unit 9 attaches printer output information to the printed print data. Here, the control unit 9 performs an information attaching function of the present invention. Selection of one of the host devices 4A and 4B is made by referring to the selection-data list 54 based on the contents of the appendix information sent from the client device 3 to the printer device 2.

A typical example of the selection-data list 54 includes host names and user names associated with each of the host names. For example, a user X and a user Y are associated with the host device 4A, and a user Z is associated with the host device 4B. If the appendix information indicates the user X as a person requesting printing of the print data, the user X is looked for in the selection-data list 54, and the host device 4A corresponding to the user name X is selected as a recipient of the printed print data. Another example of the selection-data list 54 may include hose names and virtual printer names associated with each of the host names. In this case, a virtual printer name indicated in the appendix data is used as a key to select one of the host devices 4A and 4B.

Accordingly, even when there are a plurality of host devices, the client device 3 can automatically select one of the host devices as a recipient of the print data. Further, dynamic control can be made with regard to selection of a recipient host device.

Although the first through ninth embodiments have been described with reference to particular configurations and operations, the present invention is not limited to these particular configurations and operations. Modifications may be made to a given embodiment to create a variation thereof by picking up one feature from one embodiment and another feature from another embodiment so as to create a different combination of various features delineated above as part of the present invention. Such an obvious variation is intended to be part of the present disclosure, and the scope of the invention is defined by claims attached hereto.

Figure 16:
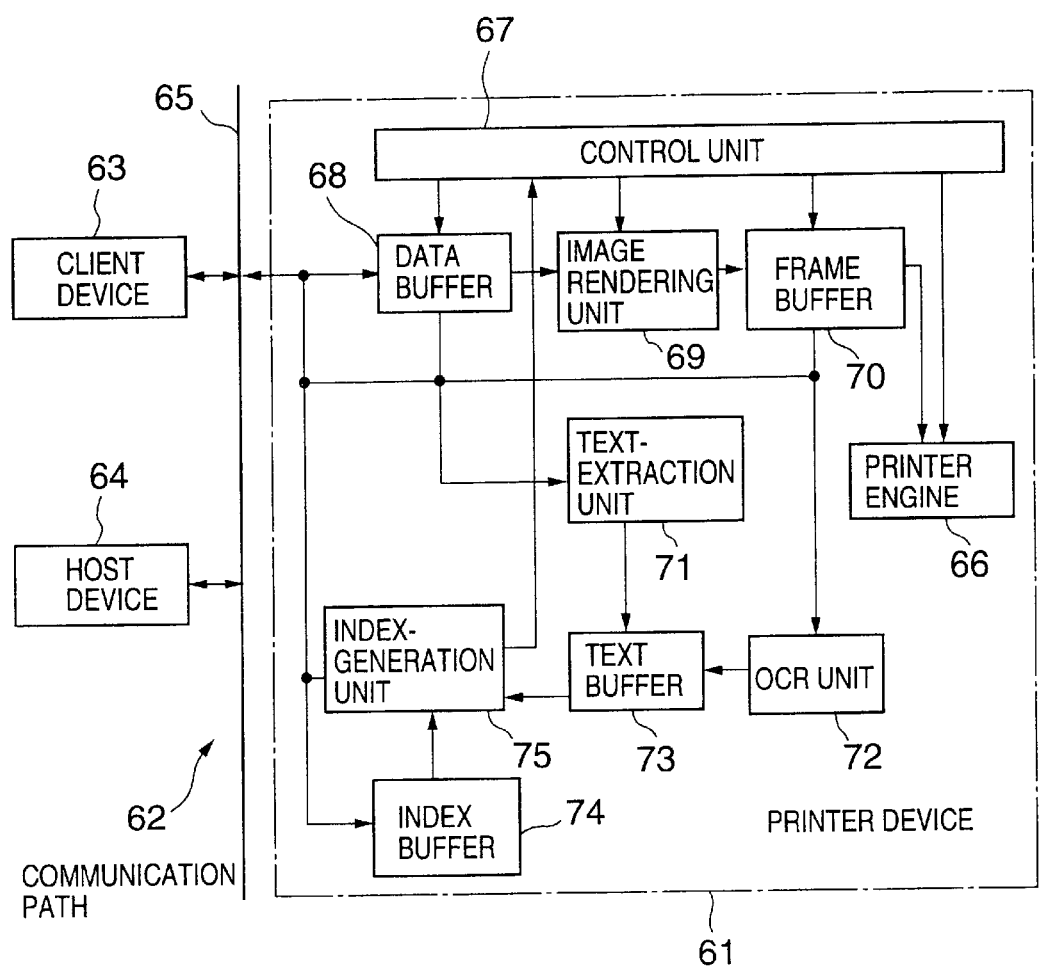
FIG. 16 is a block diagram of a print system according to a tenth embodiment of the present invention.

FIG. 16 is a block diagram of a print system according to a tenth embodiment of the present invention.

A print system 62 of FIG. 16 includes a printer device 61, a client device 63, a host device 64, and a communication path 65 connecting these devices together. The communication path 65 may be comprised of a LAN or the like capable of two-way communication. The client device 63 may be a personal computer, a word-processor device, or the like. The client device 63 has various computing functions for attending to data processing, and sends print data to the printer device 61 via the communication path 65. One or more client devices 63 may be provided as many as necessary, and are connected to the communication path 65. The host device 64 may be a personal computer, a workstation, or the like, and may serve as a platform where a database is built. The host device 64 has various computing functions to attend to data processing, and is provided with a large memory capacity. More than one host device 64 may be provided as many as necessary.

The printer device 61 includes a printer engine 66 and a control unit 67. The printer engine 66 utilizes an electronic printing process or the like to print a reproduction based on print data. The control unit 67 exchanges data with the client device 63, the host device 64, and the printer engine 66, and attends to various control operations. The printer device 61 further includes a data buffer 68, an image rendering unit 69, a frame buffer 70, a text-extraction unit 71, an OCR (optical character recognition) unit 72, a text buffer 73, an index buffer 74, and an index-generation unit 75.

The data buffer 68 temporarily stores print data. The image rendering unit 69 serves as an image expanding means to expand the print data into image data. The frame buffer 70 stores the expanded image data, which is to be supplied to the printer engine 66 for the printing purpose. The text-extraction unit 71 extracts text data from the print data stored in the data buffer 68. The OCR unit 72 generates text data from the image data stored in the frame buffer 70 through an optical character recognition process. The text buffer 73 stores the text data obtained by the text-extraction unit 71 or the OCR unit 72. The index buffer 74 stores index information supplied from the client device 63. The index-generation unit 75 attaches the index information to the text data supplied from the text buffer 73. All of the above-identified elements are not essential, and some of the elements can be omitted depending on an object to be achieved, as will be described later in detail. Here, the control unit 67 implements various functions such as a data-transfer function, a client-information attaching function, a transmission/non-transmission selecting function, etc.

In this configuration, when the client device 63 transmits print data, the printer device 61 receives the print data and stores it in the data buffer 68. Under the control of the control unit 67, the print data stored in the data buffer 68 is expanded into image data by the image rendering unit 69, and the expanded image data is stored in the frame buffer 70. The image data is then supplied from the frame buffer 70 to the printer engine 66 for the printing purpose.

The print data stored in the data buffer 68 is supplied to the text-extraction unit 71 if necessary, and the text-extraction unit 71 extracts text data from the print data. The extracted text data is stored in the text buffer 73. Alternatively, the image data stored in the frame buffer 70 is supplied to the OCR unit 72, and the OCR unit 72 obtains text data from the image data. The obtained the data is stored in the text buffer 73. That is, the text data may be extracted from the print data, or may be obtained from the image data through an optical character recognition process or the like.

The index-generation unit 75 attaches index information to the text data obtained from the text buffer 73 where the index information is supplied from the client and is stored in the index buffer 74. This process performed by the index-generation unit 75 may be part of the functions performed by the control unit 67. Alternatively, the index information may be automatically generated in the printer device 61.

The index information may include a client name of a client which transmitted the print data, a date and time indicative of when the print data was received, keywords extracted from the text data, etc. An example of the index information is as follows.

List 1

AAA-PC:1999-02-20:printer:client:keywords Items included in the list are separated by colons ":". The keywords may be those which are most frequently found in the text data, or may be those which are registered in a keyword list and found in the text data.

In the following, variations of the tenth embodiment described above will be described with reference to the accompanying drawings.

Figure 17:
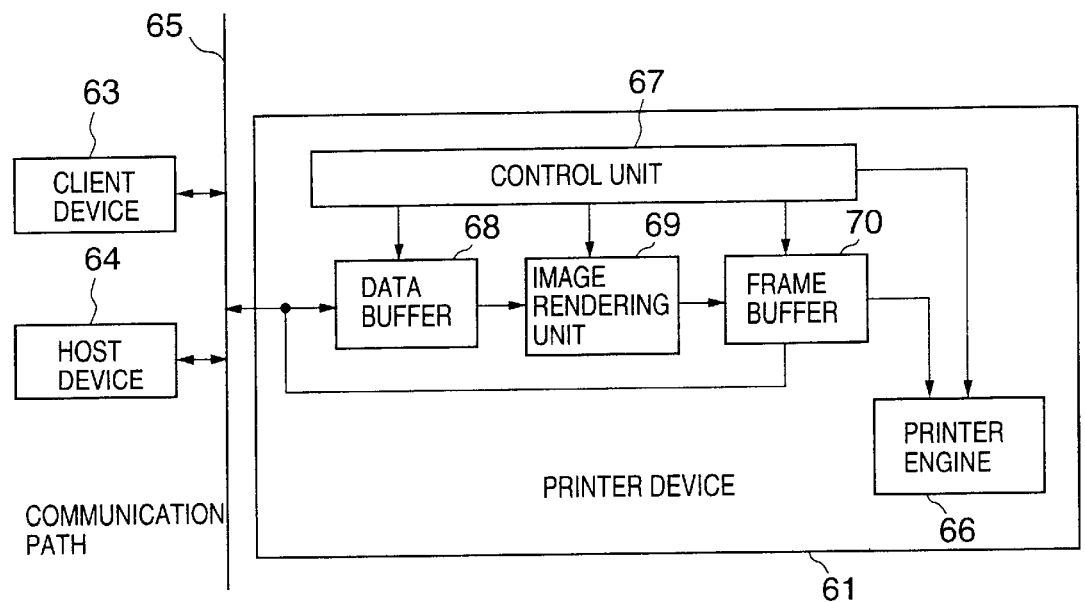
FIG. 17 is a block diagram of a print system according to a first variation of the tenth embodiment.

FIG. 17 is a block diagram of a print system according to a first variation of the tenth embodiment. In FIG. 17, the same elements as those of FIG. 16 are referred to by the same numerals, and a description thereof will be omitted.

After printing or at an appropriate timing prior to an end of printing, the control unit 67 transmits the printed image data from the frame buffer 70 to the host device 64 via the communication path 65. By having the printer device 61 send image data to the host device 64 and having the host device 64 store the image data, one can easily make reuse of the printed image data for various purposes. When another reproduction needs to be printed, for example, use of the image data makes it possible to obtain a reproduction almost identical to the original reproduction.

Figure 18:
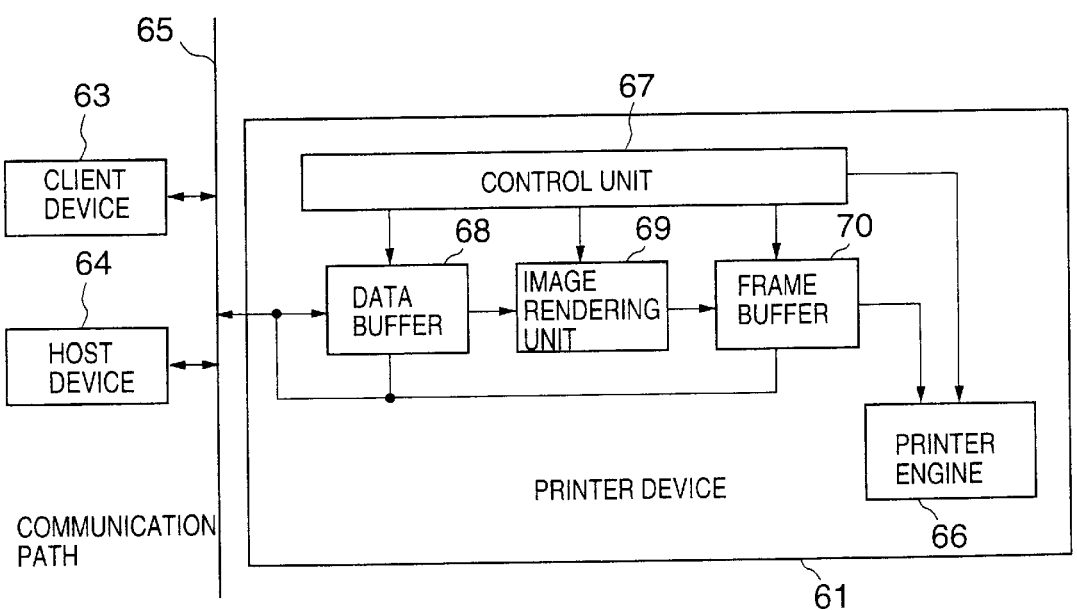
FIG. 18 is a block diagram of a print system according to a second variation of the tenth embodiment.

FIG. 18 is a block diagram of a print system according to a second variation of the tenth embodiment. In FIG. 18, the same elements as those of FIG. 16 are referred to by the same numerals, and a description thereof will be omitted.

After printing or at an appropriate timing prior to an end of printing, the control unit 67 transmits the image data stored in the frame buffer 70 and the print data stored in the data buffer 68 to the host device 64 via the communication path 65. By having the printer device 61 send image data and print data to the host device 64 and having the host device 64 store the image data and the print data, one can easily make reuse of the data for various purposes. When another reproduction needs to be printed, for example, use of the image data makes it possible to obtain a reproduction almost identical to the original reproduction. Further, when text data is needed, use of the print data allows the text data to be easily obtained without using an optical character recognition process.

Figure 19:
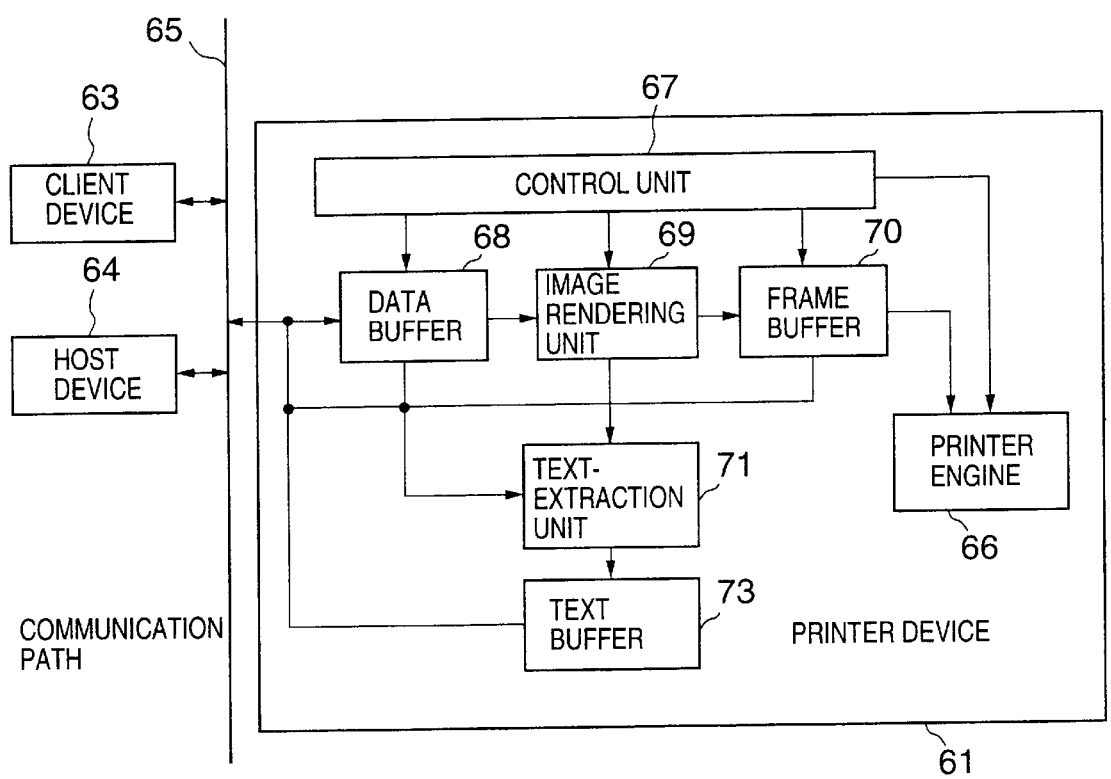
FIG. 19 is a block diagram of a print system according to a third variation of the tenth embodiment.

FIG. 19 is a block diagram of a print system according to a third variation of the tenth embodiment. In FIG. 19, the same elements as those of FIG. 16 are referred to by the same numerals, and a description thereof will be omitted.

After printing or at an appropriate timing prior to an end of printing, the control unit 67 transmits image data, print data, and text data to the host device 64 via the communication path 65 where the image data, the print data, and the text data are stored in the frame buffer 70, the data buffer 68, and the text buffer 73, respectively. By having the printer device 61 send image data, print data, and text data to the host device 64 and having the host device 64 store the image data, the print data, and the text data, one can easily make reuse of the data for various purposes. When another reproduction needs to be printed, for example, use of the image data makes it possible to obtain a reproduction almost identical to the original reproduction. Further, when text data is needed, the text data supplied from the printer device 61 as it is can be used. Since the text data is readily available from the data storage, there is no need for the host device 64 to have a program for interpreting the print data. If text data needs be to be extracted from print data, it is necessary to have a program for interpreting the print data. Since types of print data may vary depending on types of printer devices, however, such interpreting programs may need to be provided as many as there are printer devices. Having text data ready in the data storage, the host device 64 does not have to have such programs.

The text data transmitted to the host device 64 may be extracted from the image data by using the OCR unit 72 rather than being extracted from the print data by using the text-extraction unit 71.

Figure 20:
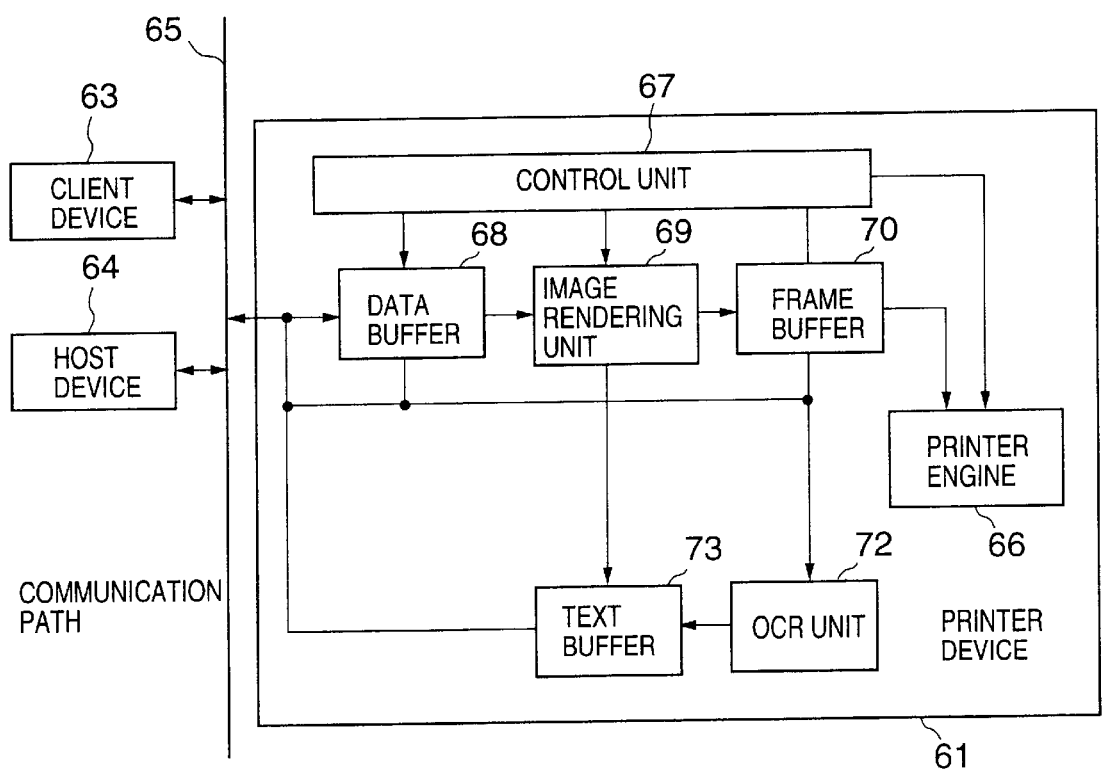
FIG. 20 is a block diagram of a print system in which text data transmitted to the host device is extracted from image data.

FIG. 20 is a block diagram of a print system in which text data transmitted to the host device is extracted from image data. This configuration offers the same advantages as those of the configuration described above.

It should be noted that all of the image data, print data, and text data do not have to be transmitted to the host device 64, and selection may be made as to which data is to be transmitted to the host device 64. Selection may be made by indicating one or more than one of the image data, print data, and text data in advance at the printer device 61. Alternatively, the selection may be made according to instructions provided from the host device 64.

In the following, a description will be given with regard to a case where transmission data type is indicated at the printer device 61, and the control unit 67 controls selection of data according to the indication.

Figure 21:
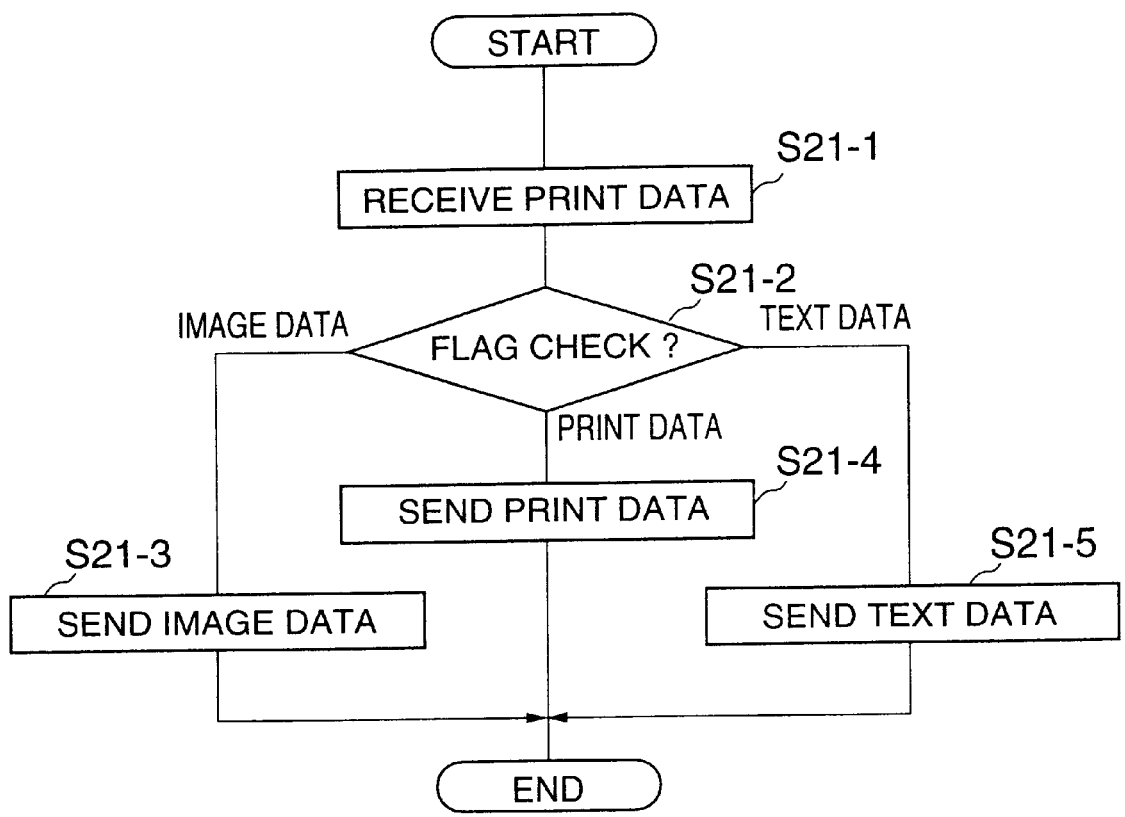
FIG. 21 is a flowchart of a process of transmitting selected data to a host device.

FIG. 21 is a flowchart of a process of transmitting selected data to a host device.

A flag is provided in the printer device 61, and, in the example of FIG. 71, it is assumed that the flag is already set through operation on an operation panel, setting of a printer driver, etc.

At a step S21-1, the printer device 61 receives print data.

At a step S21-2, the control unit 67 checks the flag. If the flag indicates "printdata", the procedure goes to a step S21-3, where the print data stored in the data buffer 68 is transmitted to the host device 64. If the flag indicates "imagedata", the procedure goes to a step S21-4, where the image data stored in the frame buffer 70 is transmitted to the host device 64. If the flag indicates "textdata", the procedure goes to a step S21-5, where the text data stored in the text buffer 73 is transmitted to the host device 64.

It should be noted that more than one data type may be indicated, so that both the print data and the text data may be sent, or both the image data and the text data may be transmitted, for example. Selection of necessary data type or types makes it possible to avoid a situation where the amount of data sent to the host device becomes unnecessarily large.

Figure 22:
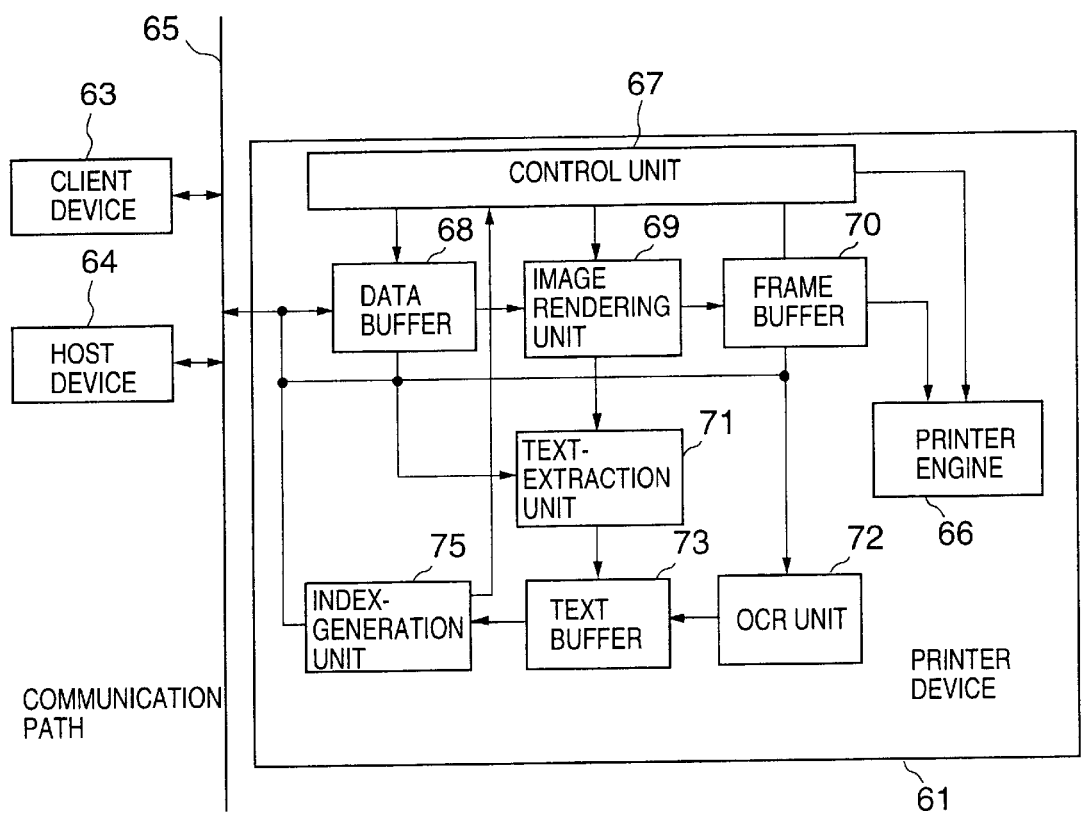
FIG. 22 is a block diagram of a print system according to a fourth variation of the tenth embodiment.

FIG. 22 is a block diagram of a print system according to a fourth variation of the tenth embodiment. In FIG. 22, the same elements as those of FIG. 16 are referred to by the same numerals, and a description thereof will be omitted.

A configuration of FIG. 22 differs from that of FIG. 16 only in that the index buffer 74 is not provided in FIG. 22. In this configuration, the index-generation unit 75 extracts index information from the text data stored in the text buffer 73, and transmits the index information as part of the text data together with at least one of print data and image data. When the index information is generated in the printer device 61, traffic of data transfer is reduced, and, at the same time, the load on the host device 64 to generate index data is eliminated.

In the following, a description will be given with regard to a fifth variation of the tenth embodiment. The fifth variation is implemented based on the configuration of FIG. 16.

When index information is obtained from the client device 63 and stored in the index buffer 74, the index-generation unit 75 adds the index information stored in the index buffer 74 to index information extracted from the text data as described above. Then, the printer device 61 sends the index data as part of the text data together with at least one of the print data and the image data to the host device 64.

In this configuration, information obtained from the client device 3 is also transmitted as part of the index information to the host device 64, so that designing of a database on the host device 64 becomes easier.

In the following, a description will be given with regard to a sixth variation of the tenth embodiment. The sixth variation is implemented based on the configuration of FIG. 16.

In the sixth variation, a decision as to whether or not to transmit data to the host device 64 is made based on the index information.

The printer device 61 has a list such as one shown in the following in its memory.

List 2

AAAAAA-PC

BBBB-PC

CCCCC-PC

This list is compared with items of the index information such as previously shown as List 1, and the control unit 67 makes a decision as to whether or not to transmit data based on the comparison.

Figure 23:
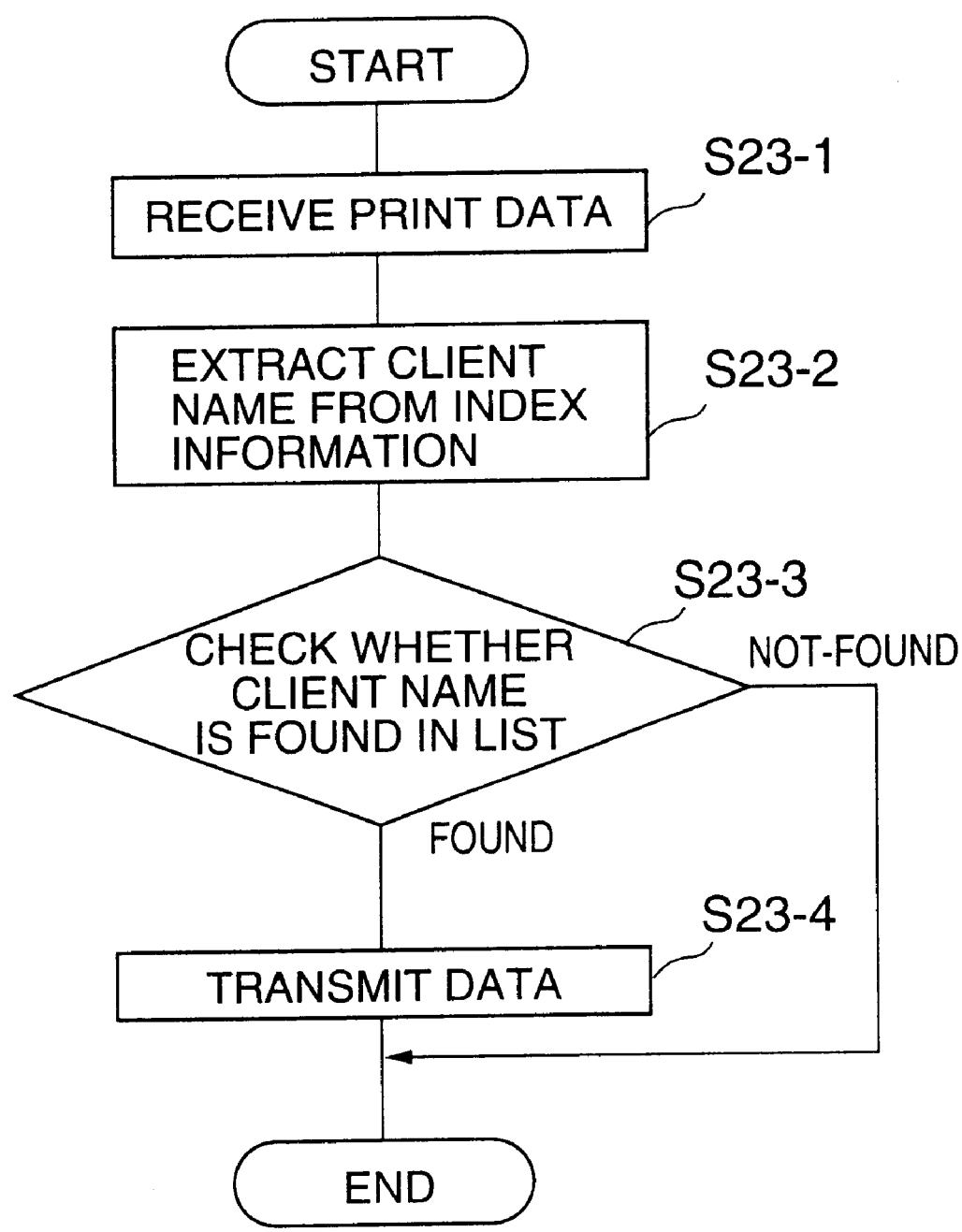
FIG. 23 is a flowchart of a process of deciding whether or not to transmit data to a host device.

FIG. 23 is a flowchart of a process of deciding whether or not to transmit data to a host device.

At a step S23-1, the printer device 61 receives print data.

At a step S23-2, a client name is extracted from the index information.

At a step S23-3, a check is made as to whether the extracted client name is found in the list such as List 2 shown above. If the client name is found, the procedure goes to a step S23-4, where data is transmitted to the host device 64. Otherwise, the data is not transmitted.

The process as described above is performed as the transmission/no-transmission selecting function of the control unit 67. With this function to decide whether or not to transmit data to the host device 64 based on the index information, the printer device 61 avoids a situation where a unnecessarily large amount of data is transmitted, thereby reducing data traffic as a whole.

In the following, a description will be given with regard to a seventh variation of the tenth embodiment. The seventh variation is implemented based on the configuration of FIG. 16.

In the seventh variation, selection of a data type to be transmitted is made based on the index information.

The printer device 61 has a list such as one shown in the following in its memory.

List 3

AAAAAA-PC: imagedata

BBBB-PC: textdata, imagedata

CCCCC-PC

In the list, a client name and a data type to be transmitted are separated by a colon. When a plurality of data types are provided, they are separated by commas. If no data type is provided with respect to a given client in the list, no data transmission is conducted with respect to that client. Further, if a given client is not named in the list, no data transmission is performed with respect to the given client.

Figure 24:
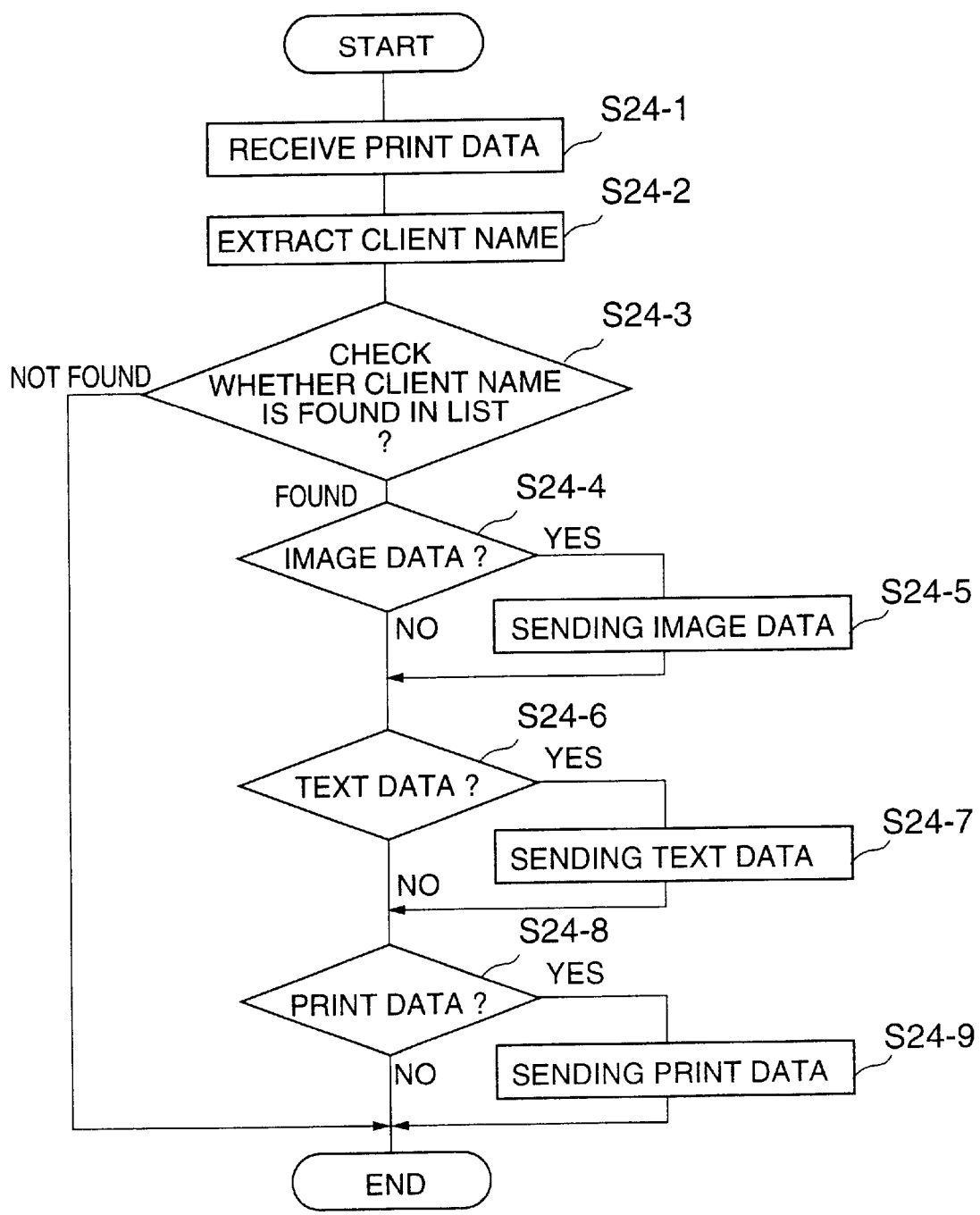
FIG. 24 is a flowchart of a process of selecting a data type to be transmitted to a host device.

FIG. 24 is a flowchart of a process of selecting a data type to be transmitted to a host device.

At a step S24-1, the printer device 61 receives print data.

At a step S24-2, a client name is extracted from the index information.

At a step S24-3, a check is made as to whether the extracted client name is found in the list such as List 3 shown above. If the client name is not found in the list, the procedure comes to an end. If the client name is found in the list, the procedure goes to a step S24-4.

At the step S24-4, a check is made as to whether the data type to be transmitted indicates "imagedata". If it does, image data stored in the frame buffer 70 is sent to the host device 64 at a step S24-5.

At a step S24-6, a check is made as to whether the data type to be transmitted indicates "textdata". If it does, text data stored in the text buffer 73 is sent to the host device 64 at a step S24-7.

At a step S24-8, a check is made as to whether the data type to be transmitted indicates "printdata". If it does, print data stored in the data buffer 68 is sent to the host device 64 at a step S24-9. Then, the procedure comes to an end.

If no data type to be transmitted is indicated, no data is sent to the host device 64. Indication of the data type to be transmitted is not limited to one data type, but may include a plurality of data types.

In this manner, a decision as to not only whether or not to transmit data to the host device 64 but also what data type is to be transmitted is made based on the index information. This insures that a size of data to be transmitted is no more than that which is necessary, thereby reducing traffic of transmitted data than it would otherwise be. Further, this configuration provides a diligent control of data transmission.

In the following, a description will be given with regard to an eighth variation of the tenth embodiment. The eighth variation is implemented based on the configuration of FIG. 16.

In the eighth variation, when a plurality of host devices 64 are provided, one of the host devices is selected as a recipient of transmitted data based on the index information.

The printer device 61 has a list such as one shown in the following in its memory.

List 4
AAAAAA-PC: HOST1
BBBB-PC: HOST2
CCCCC-PC

In the list, a client name and a name of a recipient host data are separated by colon. If a name of a recipient host device is not provided, no data transmission is conducted with respect to the client. Further, if a given client is not named in the list, no data transmission is performed with respect to the given client.

Figure 25:
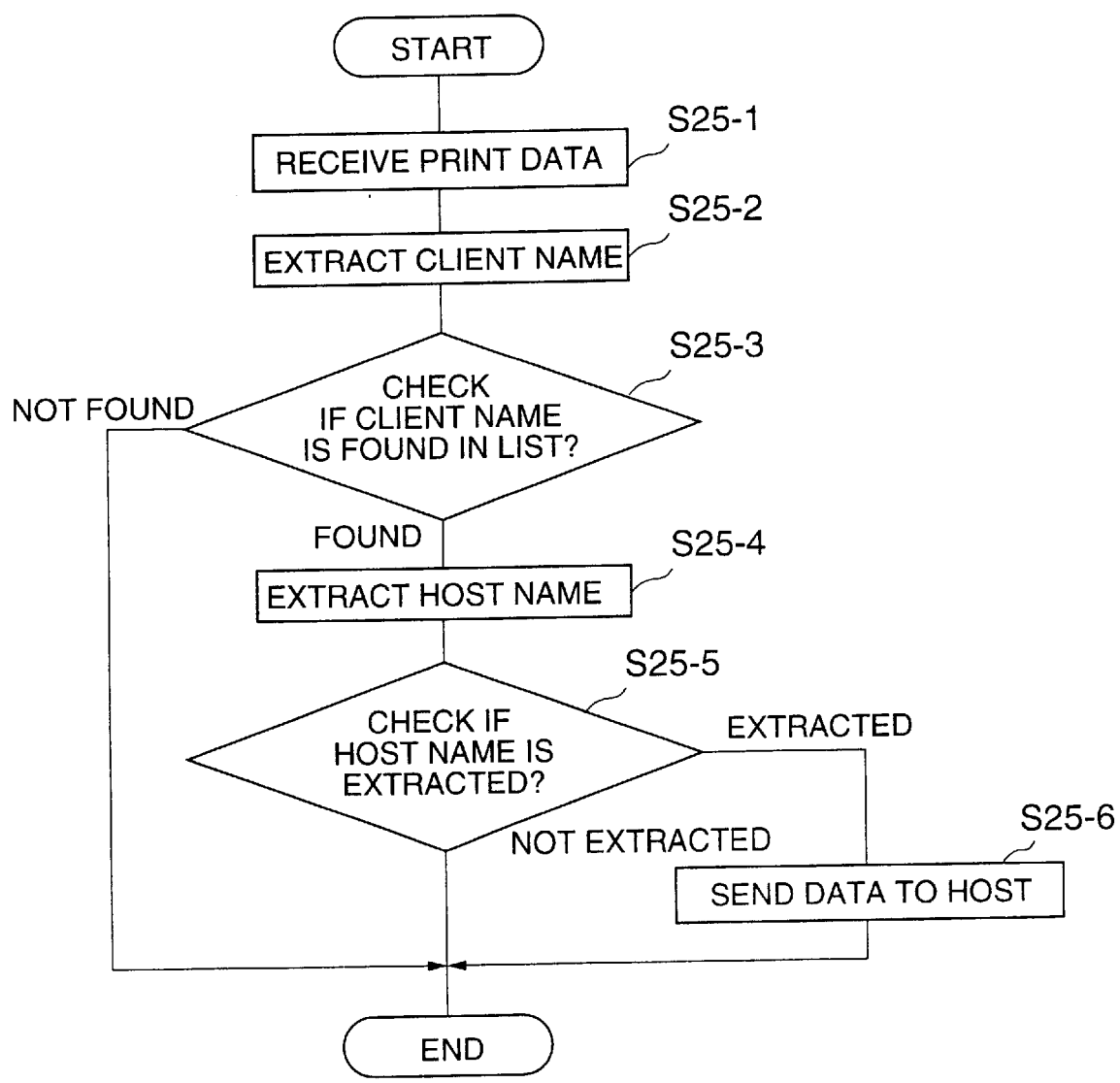
FIG. 25 is a flowchart of a process of selecting a host device to receive data.

FIG. 25 is a flowchart of a process of selecting a host device to receive data.

At a step S25-1, the printer device 61 receives print data.

At a step S25-2, a client name is extracted from the index information.

At a step S25-3, a check is made as to whether the extracted client name is found in the list such as List 4 shown above. If the client name is not found in the list, the procedure comes to an end. If the client name is found in the list, the procedure goes to a step S25-4.

At the step S25-4, an attempt is made to extract a host name from the list.

At a step S25-5, a check is made as to whether the host name is extracted. If the host name is extracted, the procedure goes to a step S25-6, where data is transmitted to the host device 64 having the extracted host name. Otherwise, the procedure comes to an end.

In this manner, selection of a recipient host device is made based on the index information. This configuration allows automatic selection of a recipient host device without requiring a user to spend time and labor to select the host device when a plurality of host devices are connected to the communication path.

Further, the present invention is not limited to these embodiments, but various variations and modifications may be made without departing from the scope of the present invention.

The present application is based on Japanese priority applications No. 11-223329 filed on Aug. 6, 1999, No. 11-77054 filed on Mar. 23, 1999, and No. 10-287847 filed on Oct. 9, 1998, with the Japanese Patent Office, the entire contents of which are hereby incorporated by reference.

What is claimed is:

1. A print system, comprising:
a communication path;
a client device which transmits print data to said communication path;
a host device connected to said communication path; and
a printer device which prints the print data after receiving the print data from said client device via said communication path, and automatically sends the print data together with corresponding printer output information in addition to the print data to said host device via said communication path, said printer output information including keywords for identifying said corresponding print data, and which keywords are usable for a search of the corresponding print data.

2. The print system as claimed in claim 1, wherein said printer device operates as a selected one of virtual printers, and said printer output information includes an identification of the selected one of virtual printers.

3. The print system as claimed in claim 2, wherein said printer device stores in a memory thereof an appendix-data list including names of the virtual printers and keywords associated with each of the names, and the printer output information includes the keywords associated with the selected one of the virtual printers.

4. The print system as claimed in claim 1, wherein said printer device receives client information from said client device, and said printer output information includes the received client information.

5. The print system as claimed in claim 4, wherein said client device allows a user to set the client information at said client device.

6. The print system as claimed in claim 4, wherein said printer device stores in a memory thereof a data list, and wherein said client device receives the data list from said printer device, and generates the client information by allowing a user to set the client information based on the received data list.

7. The print system as claimed in claim 4, wherein said host device stores in a memory thereof a data list, and wherein said client device receives the data list from said host device, and generates the client information by allowing a user to set the client information based on the received data list.

8. The print system as claimed in claim 4, wherein said printer device sends the print data together with the printer output information to said host device when the received client information indicates transmission of the print data, and does not send the print data together with the printer output information to said host device when the received client information indicates no transmission of the print data.

9. The print system as claimed in claim 4, comprising a plurality of host devices that includes said host device and are connected to said communication path, wherein said printer device sends the print data together with the printer output information to a selected one of said host devices that is indicated in the received client information.

10. The print system as claimed in claim 4, comprising a plurality of host devices that includes said host device and are connected to said communication path, each of said plurality of host devices including in a memory thereof a data list and sending the data list to said printer device, wherein said printer device sends the print data together with the printer output information to one of said host devices that is selected by comparing the received client information with the data list sent from said plurality of host devices.

11. A printer device connected to a client device and a host device via a communication path, comprising:
   a memory unit which stores print data therein sent from the client device via the communication path;
   a printer engine which prints the print data stored in said memory unit; and
   a processing unit which automatically sends corresponding printer output information together with and in addition to the print data stored in said memory unit to the host device via the communication path when said printer engine prints the print data, said printer output information including keywords for identifying said print data, and which keywords are usable for a search of the corresponding print data.

12. The printer device as claimed in claim 11, wherein said processing unit incorporates client information into the printer output information, the client information being received from the client device via the communication path.

13. The printer device as claimed in claim 12, wherein said printer device sends the print data together with the printer output information to the host device when the client information indicates transmission of the print data, and does not send the print data together with the printer output information to the host device when the client information indicates no transmission of the print data.

14. The printer device as claimed in claim 12, wherein said processing unit sends the print data together with the printer output information to a selected host device that is indicated in the client information when a plurality of host devices are connected to the communication path.

15. The printer device as claimed in claim 12, wherein said processing unit sends the print data together with the printer output information to a selected host device when a plurality of host devices are connected to the communication path, said processing unit selecting said selected host device by comparing the client information with data list sent from the host devices.

16. A printer device connected to a client device and a host device via a communication path, comprising:
   a data buffer which stores print data therein received from the client device via the communication path;
   an image rendering unit which generates image data by expanding the print data stored in said data buffer;
   a frame buffer which stores therein the image data;
   a printer engine which prints the image data supplied from said frame buffer; and
   a control unit which automatically sends the image data to the host device via the communication path, when said printer engine prints the image data, together with corresponding printer output information including keywords for identifying the corresponding image data, and which keywords are usable for a search of the corresponding print data.

17. A printer device connected to a client device and a host device via a communication path, comprising:
   a data buffer which stores print data therein received from the client device via the communication path;
   an image rendering unit which generates image data by expanding the print data stored in said data buffer;
   a frame buffer which stores therein the image data;
   a printer engine which prints the image data supplied from said frame buffer;
   a text buffer which stores therein text data corresponding to the print data; and
   a control unit which automatically sends at least one of the image data, the print data, and the text data to the host device via the communication path, when said printer engine prints the image data, together with corresponding printer output information including keywords for identifying the corresponding image data, and which keywords are usable for a search of the corresponding print data.

18. The printer device as claimed in claim 17, further includes a text-extraction unit which extracts the text data from the print data stored in said data buffer, and stores the text data in said text buffer.

19. The printer device as claimed in claim 17, further includes a character recognition unit which extracts the text data from the image data stored in said frame buffer, and stores the text data in said text buffer.

20. The printer device as claimed in claim 17, further includes a memory unit which stores a flag, wherein said control unit selects said at least one of the image data, the print data, and the text data that is indicated by the flag.

21. The printer device as claimed in claim 17, further includes an index-generation unit which generates index information from the text data, and said control unit sends the index information as part of the text data to the host device via the communication path, said index information including the keywords for identifying the text data.

22. The printer device as claimed in claim 21, further includes an index buffer which stores therein client information received from the client device via the communication path, wherein said index-generation unit adds the client information to the index information generated from the text data.

23. The printer device as claimed in claim 21, wherein said control unit selects based on the index information whether or not to send said at least one of the image data, the print data, and the text data to the host device.

24. The printer device as claimed in claim 21, wherein said control unit selects based on the index information which data of the image data, the print data, and the text data is sent to the host device.

25. The printer device as claimed in claim 21, wherein said control unit sends said at least one of the image data, the print data, and the text data to a host device that is selected based on the index information when a plurality of host devices are connected to the communication path.

* * * * *